United States Patent [19]

Rudd

[11] 4,103,982
[45] Aug. 1, 1978

[54] ACCESSORY LOCKING MOUNT

[75] Inventor: Edward H. Rudd, Wooster, Ohio

[73] Assignee: Magni-Power Company, Wooster, Ohio

[21] Appl. No.: 742,252

[22] Filed: Nov. 16, 1976

[51] Int. Cl.² ............................................. H01R 13/54
[52] U.S. Cl. ............................ 339/91 R; 70/DIG. 58; 248/203; 339/125 R
[58] Field of Search ............... 339/75 R, 91 R, 125 R; 248/203, 274; 70/232, DIG. 58, 70, 50

[56] References Cited

U.S. PATENT DOCUMENTS

| | | | |
|---|---|---|---|
| 3,513,478 | 5/1970 | Kemper et al. | 339/125 R X |
| 3,822,049 | 7/1974 | Saunders | 248/203 |
| 3,913,880 | 10/1975 | Lucasey et al. | 70/232 X |
| 3,994,148 | 11/1976 | Anderson | 248/203 X |

*Primary Examiner*—Roy Lake
*Assistant Examiner*—E. F. Desmond
*Attorney, Agent, or Firm*—Watts, Hoffmann, Fisher & Heinke Co.

[57] ABSTRACT

The invention provides an accessory locking mount for removably attaching a CB radio or other electrical accessory to a support member. The mount includes a first, adjustable bracket to which the accessory is rigidly affixed and which tightly embraces the accessory to carry the accessory. The mount also includes a second, adjustable bracket rigidly affixed to a support member and adapted to slidably receive the first bracket. The various elements are assembled by carriage bolts having rounded heads projecting outwardly of the mount. The bolts cannot be loosened or removed from outside the mount so that unauthorized adjustment or removal of the mount is not possible when the first and second brackets are engaged. An internally disposed, ramp-like, plug-in electrical connector is employed to permit the accessory to be carried wherever desired upon disengagement of the first and second brackets. When the first and second brackets are engaged, all of the components, including the body of a locking device, are inaccessible from outside the device.

13 Claims, 4 Drawing Figures

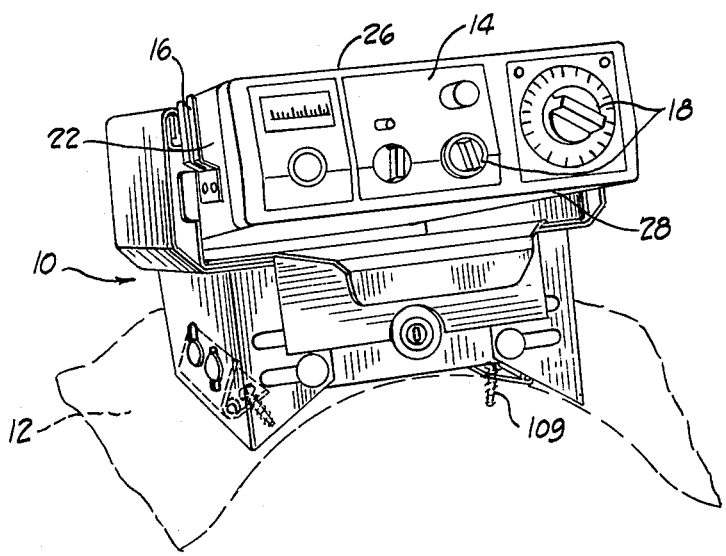
Fig. 1
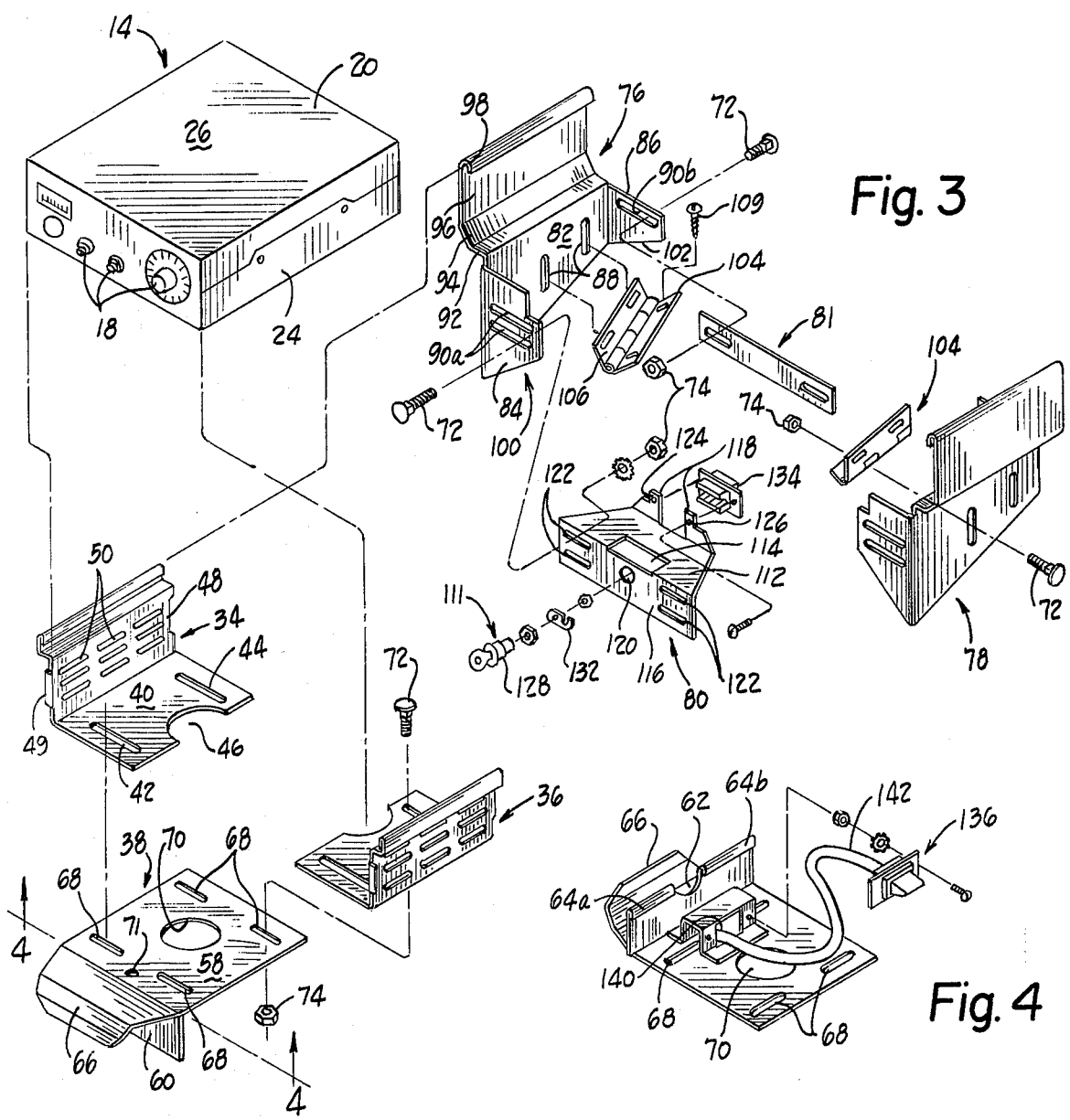
Fig. 3
Fig. 4

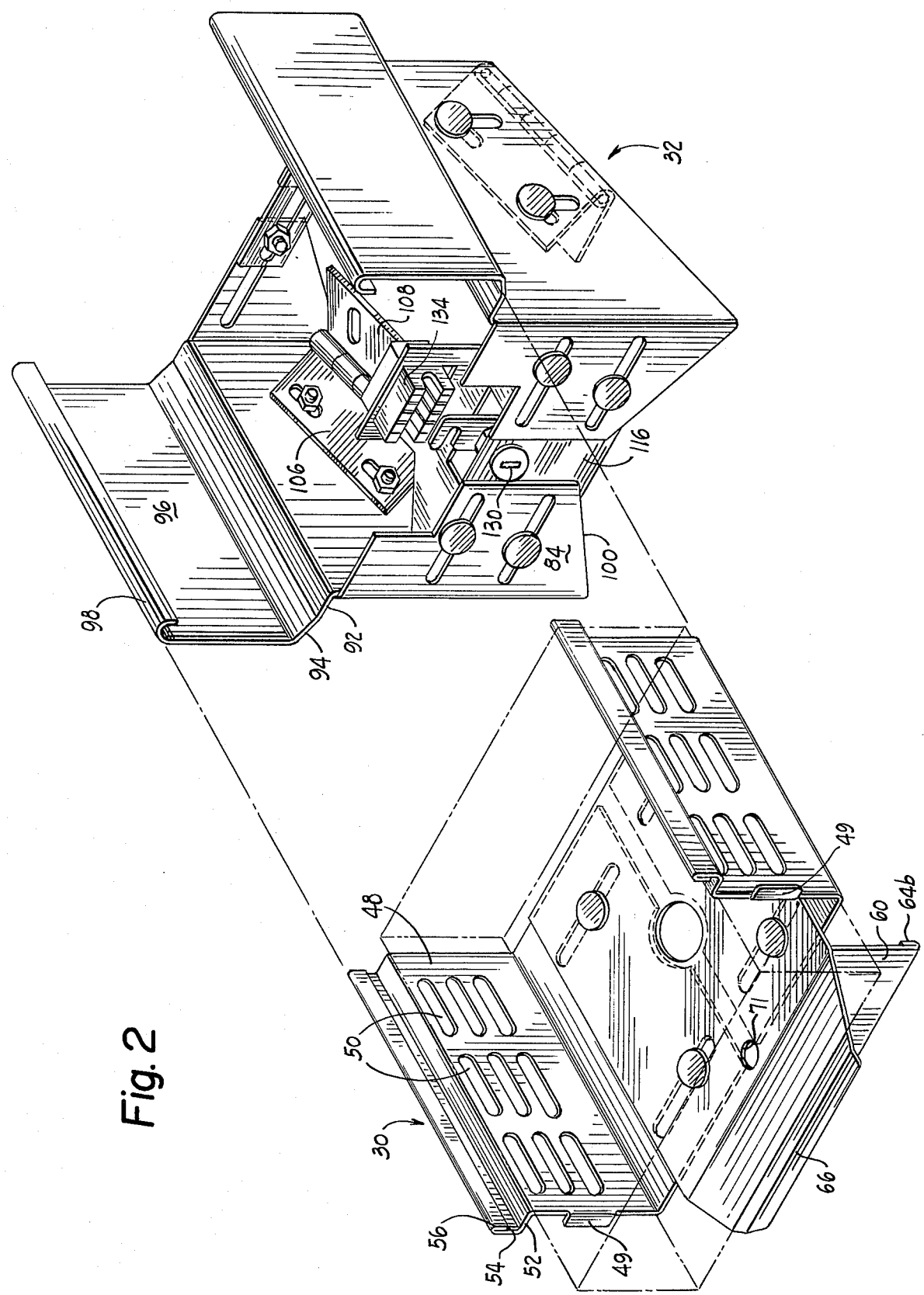

ACCESSORY LOCKING MOUNT

BACKGROUND OF THE INVENTION

1. Field of the Invention

The invention relates to accessory locking mounts, and, more particularly, to a locking mount adjustable to fit many electrical accessories used in vehicles and adaptable to be fastened securely to a support member in the interior of the vehicle.

2. Description of the Prior Art

Many prior vehicle accessory mounts have been attached directly to an interior support member, such as the underside of a dashboard, by mounting means such as screws or nuts and bolts. These conventional mounts may be adequate to support the accessory properly, but the mounting means often are easily accessible so that they may be removed rather easily to permit the theft of the electrical accessory carried by the mount. This, obviously, is undesirable and many attempts have been made to overcome the problem of supporting an accessory adequately and yet preventing the theft of the accessory.

One prior art approach to the problem employs a first bracket assembly rigidly secured to the support member and a second bracket assembly rigidly affixed to the accessory. The two brackets are engagable selectively so that, if desired, the accessory with its bracket affixed can be removed from the vehicle. Alternatively, the accessory can be installed in the vehicle by engaging the two brackets so that the accessory can be carried by the support member.

A prior art device of this nature is exemplified by U.S. Pat. No. 3,822,049, which employs a bracket affixed to the underside of the dashboard. This type of mounting has several deficiencies, one of which is excessive vibration. It is well known that the dashboard itself is subject to vibration because it usually is suspended or cantilevered from a frame member. Accordingly, anything affixed to the underside of the dashboard also is subject to vibration, although usually of greater severity than components disposed internally of the dashboard.

A second problem is the relative ease with which items affixed to the dashboard may be separated from the dashboard. The dashboard commonly is made of rather light-weight sheet metal which may be sheared readily. Also, particularly with items suspended from the underside of the dashboard, it usually is a simple matter to reach behind the dashboard and obtain access to fastening members extending upwardly through the underside of the dashboard.

Prior art devices also have been deficient as regards the security of the bracket-to-bracket attachment. Commonly, some form of lock is employed which is exposed. Accordingly, it is easy to tamper with the lock and perhaps ultimately destroy the lock or otherwise separate the brackets.

SUMMARY OF THE INVENTION

The invention provides an accessory locking mount for removably attaching an accessory to a support member which overcomes many of the problems of prior art designs. This is achieved by a mounting apparatus which is extremely strong for its size and weight, and which is virtually tamper-proof.

The mount includes a first bracket to which the accessory is rigidly affixed and which tightly embraces the accessory to carry the accessory. The first bracket is comprised of elements slidable relative to each other to permit the first bracket to carry accessories of different sizes.

The mount also includes a second bracket rigidly affixed to a support member and adapted to slidably receive the first bracket. The second bracket, like the first bracket, is comprised of elements slidable relative to each other to permit the second bracket to accept the first bracket, however configured, and also to permit the second bracket to firmly engage the support member.

The various elements are assembled by carriage bolts having rounded heads projecting outwardly of the device. By the use of these bolts, the bolts cannot be loosened or removed from outside the mount so that unauthorized adjustment or removal of the mount is not possible when the first and second brackets are engaged. An internally disposed, ramp-like, plug-in electrical connector is employed to permit the accessory to be carried wherever desired upon disengagement of the first and second brackets. When the first and second brackets are engaged, all of the components, including the body of a locking device, are inaccessible from outside the mount. Accordingly, unauthorized removal of the accessory or the mount is made extremely difficult, if not impossible, without having access to the locking device.

DESCRIPTION OF THE DRAWINGS

FIG. 1 is a perspective view of an accessory locking mount constructed in accordance with the invention, carrying an electrical accessory, and assembled in place in a vehicle;

FIG. 2 is a view similar to FIG. 1 with the accessory drawn in phantom, and the first and second brackets separated to expose the interior of the second bracket.

FIG. 3 is an exploded view of an accessory locking mount according to the present invention and illustrating in more detail the elements slidable with respect to each other.

FIG. 4 is a view taken along line 4—4 of FIG. 3 and illustrating in more detail a portion of a plug-in electrical connector.

DESCRIPTION OF THE PREFERRED EMBODIMENT

An accessory locking mount 10, as shown in FIG. 1, is attached to a vehicle transmission cover 12. An accessory which is a CB radio 14 is secured to the mount 10. The radio 14 includes a bracket 16 for a microphone as well as various controls 18 to operate the radio. The radio is of conventional design and includes a generally rectangular outer casing 20 having spaced sidewalls 22, 24 and spaced top and bottom walls 26, 28. The outer casing 20 commonly is comprised of a light-gauge sheet metal sufficient to adequately support the radio 14 and yet which may be drilled at various locations for mounting in various support devices.

Referring now to FIG. 2, the accessory locking mount 10 is shown partially disassembled and with the radio 14 drawn in phantom. The accessory locking mount 10 includes a first bracket 30 and a second bracket 32. Referring now also to FIG. 3, the first bracket 30 is comprised of side elements 34, 36 and center element 38. The side elements 34, 36 are mirror images of each other and, hence, only one element will be described in detail.

Side element 34, for example, includes a planar portion 40 having slots 42, 44, and a semi-circular recess 46. The side element 34 also includes a sidewall 48 disposed substantially at right angles to planar portion 40. The sidewall 48 carries an outwardly extending tab 49. The sidewall 48 also includes a plurality of slots 50 and, at its top, an outwardly extending portion 52 and a generally vertically extending portion 54 bent back upon itself, as at 56. Corresponding portions of the other side element 36 substantially are identical to the portions of the side element 34 already described and perform the same functions, as will be described.

The center element 38, as best shown in FIGS. 3 and 4, is comprised of a planar portion 58 and a guard wall 60 disposed substantially at a right angle to planar portion 58. The guard wall 60 includes a semi-circular recess 62 and bent-back portions 64a, 64b. The planar portion 58 also includes a tab 66 extending outwardly thereof at an obtuse angle as shown in FIG. 3. The planar portion 58 also includes a plurality of slots 68 and a circular opening 70. An opening 71, smaller than opening 70, is disposed intermediate opening 71 and slots 68.

Each of the elements 34, 36, and 38 of the first bracket 30 is made of high-strength sheet metal. The elements 34, 36 may be formed in a single stamping operation. The same is true of element 38, except that either guard wall 60 or tab 66 must be added later, as by welding.

It will be apparent from an examination of the drawing figures that the elements 34, 36, and 38 are slidable relative to each other. This is facilitated by bolted fasteners 72 which extend through the various slots and which are retained by nuts 74. The bolted fasteners 72 are carriage bolts of very high strength, with rounded heads and square shanks to prevent their turning within the slots. In order to minimize expense and increase the security of the accessory locking mount 10, identical bolted fasteners 72 and nuts 74 are employed throughout where practical.

When the bolted fasteners 72 are disposed loosely within slots 42, 44 and 68, the elements 34, 36, and 38 may be adjusted relative to each other to permit the first bracket 30 to tightly embrace an accessory 14. Appropriate mounting holes may be drilled in the sidewalls 22, 24 and conventional sheet metal screws (not shown) inserted through the slots 50 to rigidly retain the accessory 14 within the first bracket 30. Of course, already-existing mounting holes may be used, if desired. Because the accessory 14 is carried at each sidewall 22, 24 and therefore is inaccessible along three walls, the accessory 14 is carried sufficiently securely that damage to the accessory 14 from excessive vibration is minimized. The outer casing 20 also is sufficiently well supported that damage to the outer casing itself from the weight of the accessory 14 is minimized. Moreover, access to any portion of the accessory 14 except the controls and the top wall 26 is made very difficult by this construction. The recesses 46 and the opening 70 combine to permit cooling air to flow upwardly into and around the accessory 14. The unused slots 50 and unused portions of the slots 42, 44, and 68 also permit cooling air to flow into and around the accessory 14. Because the vertically extending portion 54 is bent back upon itself as at 56, and because the guard wall 60 is bent back upon itself as at 64a, 64b, the chances of an operator or his clothing being cut or snagged are minimized. Additionally, the bent-back portion 56, as will be described later, is a bearing surface and the rounded edge provided by the bent-back portion 56 permits a smoother engagement and longer life to accrue to the first and second brackets 30, 32.

The second bracket 32 is comprised of side elements 76, 78, a center element 80, and a slotted bar 81. The side element 78 of second bracket 32 is a mirror image of element 76 and need not be described further. As with the side elements 34, 36 of the first bracket 30, the various slots, bolted fasteners, etc. are similarly disposed and perform identical functions.

As will be appreciated from an examination of FIGS. 1 and 2, the second bracket 32 is adapted to slidably receive the first bracket 30 after the second bracket 32 has been assembled and adjusted appropriately. Referring more particularly now to FIGS. 2 and 3, the side element 76 includes a planar portion 82 as well as a front wall 84 and a rear wall 86 disposed substantially at right angles to the planar portion. The planar portion 82 includes slots 88 and the front and rear walls 84, 86 include slots 90a, 90b. The construction of the remaining portions of the side element 76 is similar to that of the side element 34. An outwardly extending portion 92 is affixed to the top of planar portion 82. A second outwardly extending portion 94 is affixed to the portion 92 at an obtuse angle to the portion 92. A vertically extending portion 96 is affixed to portion 94 and terminates in a rounded portion 98 bent-back upon itself.

The front and rear walls 84, 86 are tapered at their bottom surface as at 100, 102 to provide a smooth engagement with the transmission cover 12. In order to securely affix the side elements 76, 78 and hence the second bracket 32 to the transmission cover 12, a hinge 104 is provided. The hinge 104 includes a first, slotted, planar portion 106 adapted to be affixed to planar portion 82 by means of bolted fasteners 72 and a second, slotted, planar portion 108 adapted to be affixed to the transmission cover 12 by means of machine screws 109.

The center element 80 is disposed intermediate the side elements 76, 78 and performs several functions. The first function is to slidably engage the side elements 76, 78 and adjustably secure the side elements by means of bolted fasteners 72. Other functions include the carrying of a portion of a plug-in electrical connector 110 and a locking device 111. The center element 80 is comprised of a planar portion 112 having a rectangular recess 114. A front wall 116 extends downwardly from planar portion 112 at substantially a right angle and a two-part rear wall 118 extends upwardly from the planar portion 112 at substantially a right angle. The front wall 116 includes a circular, substantially centered opening 120 and a plurality of slots 122. The rear wall 118 includes openings 124, 126, by which a portion of the plug-in electrical connector 110 may be mounted to the rear wall 118.

The rear walls 86 of the elements 76, 78 are joined by the slotted bar 81. As with the other elements of the accessory locking mount 10, the rear walls 86 and the bar 81 are joined by bolted fasteners 72 having rounded heads.

The locking device 111 extends through the opening 120 and includes a tumbler portion 128 having an outwardly facing key slot 130 and a pivotal, slotted finger 132 affixed to an inwardly disposed portion.

A portion of the plug-in electrical connector 110 has been illustrated as affixed to the rear wall 118 of the center element 80. This portion of the connector 110 comprises a female element 134. The remaining portion of the plug-in electrical connector 110 is shown in FIG.

4 as male element 136. The element 136 is affixed to the underside of the planar portion 58 by means of a box-like structure 138 having a generally rectangular opening 140 adapted to receive the element 136. The male and female elements 134, 136 may be interchanged, of course, without affecting operation of the mount 10.

A plurality of lead wires 142 may be connected between the element 136 and appropriate portions of the accessory 14 via opening 71. Accordingly, once the accessory 14 is permanently mounted to and embraced by the first bracket 30, a plug-in electrical connection between the accessory 14 and portions of the vehicle now is possible. All that is required is that lead wires (not shown) be attached to the female element 134 and connected at their other ends to appropriate electrical components carried by the vehicle. When the first and second brackets are tightly engaged, the plug-in electrical connector 110 also is engaged, with the further result that electrical power may be provided to the accessory 14. Damage to the connector 110 from an excessively rapid engagement of the first and second brackets 30, 32 is prevented by the tabs 49, the backside of which engage the front of vertically extending portions 96 to limit the displacement of the first bracket 30. When the first and second brackets are disengaged, the plug-in electrical connector 110 also is disengaged, with the further result that the electrical accessory 14 may be transported readily without interference from connecting wires.

It will be apparent from FIGS. 2 and 4 that the slotted finger 132, when extended as in FIG. 2, and with the first and second brackets 32, 34 completely engaged, will extend between the rear of guard wall 60 and the front of box-like structure 138. With these elements in this position, disengagement of the first bracket 30 from the second bracket 32 is not possible because the box-like structure 138 is engaged by the slotted finger 132.

Assembly and Operation

The stages of assembly are as follows:

1. The first bracket 30 is assembled by loosely disposing the bolted fasteners 72 within the appropriate slots.

2. The electrical wires 142 are connected from the accessory 14 through the circular opening 71 to the male element 136 of the plug-in electrical connector 110.

3. The accessory 14 is rigidly affixed to the side elements 34, 36 by appropriate fasteners, prefereably with existing mounting holes in the sidewalls 22, 24. If necessary, the outer casing 20 may be drilled to match the slots 50 and sheet metal screws employed to engage the side elements 34, 36 and the sidewalls 22, 24.

4. Bolted fasteners 72 are tightened in the first bracket 30 and are assembled loosely in appropriate slots in the second bracket 32.

5. The first bracket is inserted into the second bracket until the backside of the tabs 49 engage the front of the vertically extending portions 96 and the elements of the plug-in electrical connector 110 are firmly engaged. The bolted fasteners 72 joining the side elements 76, 78 by means of the center element 80 and the bar 81 then are tightened.

6. The first bracket is disengaged from the second bracket and the hinges 104 are rigidly affixed to the transmission cover 12 by means of machine screws. Of course, fore-and-aft adjustments of the second bracket 32 are made as necessary to properly position the accessory locking mount 10 within the vehicle.

7. The accessory locking mount 10 now is ready for use and, upon complete engagement of the first and second brackets 30, 32, locking device 111 may be employed to prevent the unauthorized disengagement of the first and second brackets 30, 32.

It will be appreciated that the accessory locking mount 10 according to the present invention is an extremely steady and secure means by which an accessory 14 may be affixed to a support member within a vehicle. Most advantageously, the mount 10 is affixed directly to the transmission cover 12 where it securely and rigidly mounts the accessory 14 and protects it from excessive vibration, unlike certain dash-mounted accessory mounts. If desired, however, the accessory locking mount 10 may be installed to the underside of the dashboard in the same manner as it is installed to the transmission cover 12. The only difference is that the accessory 14 will be suspended from the side elements 34, 36 and the accessory 14 must be disposed within the first bracket 30 upside-down compared to the position illustrated in the drawing figures.

Because the unit is fabricated from heavy-gauge steel and because of the special interlock design of the slides, unauthorized removal of the first bracket is virtually impossible. The rounded top portion 98 securely engages the smooth top of the bent-back portion 56 to provide a smooth, long-lasting bearing surface. The unique design of the outwardly extending portions of the side elements permits a slight flexing of the elements as the first and second brackets 30, 32 are engaged. By this construction, a shock absorber-type carriage is provided for the accessory 14 and undesirable vibration and noise substantially is eliminated.

The locking device 111 included as part of the present invention is far superior to prior art designs because the only exposed portion of the locking device is key slot 130. All of the other portions of the locking device 111 are disposed internally of the first and second brackets 30, 32 when the first and second brackets are engaged. Accordingly, access to internally disposed portions of the locking device 111 is all but impossible and a proper key is required to disengage the first and second brackets. Prior art exposed-lock designs clearly are inferior in this regard.

Another advantage resides in the plug-in electrical connector 110 having male and female elements 134, 136. Prior art accessory mounts have provided plug-in connectors, but the connector 110 of the present invention is of a ramp-like design which is extremely robust and which includes wide engaging surfaces to conduct electricity well. Because the ramp-like structure of the connector 110 does not employ conventional pins and corresponding holes, the chances of inadvertently bending the pins is eliminated. The connector 110 is particularly well-suited for an accessory mount because the first and second brackets may be expected on certain occasions to be engaged with great force. Also, the tolerances between the various slidable elements are such that a conventional connector may be ruined, especially as the elements wear and as tolerances increase.

It also will be appreciated that the various elements of the present invention may be adjusted to permit attachment of the mount to virtually any type of transmission cover or dash or even to a vehicle sidewall, and yet the elements will embrace virtually any type of electrical accessory commonly employed in vehicles. Because round-headed carriage bolts are employed in those places where fasteners are exposed, turning, tampering, and consequent unauthorized removal of the bolted fasteners thus is minimized to a great extent.

While a specific embodiment of the invention has been described, it will be obvious to those skilled in the art that changes and modifications may be made without departing from the invention. It therefore is intended in the appended claims to cover all such changes and modifications that fall within the true spirit and scope of the invention.

I claim:

1. A locking mount for attaching an accessory to a support member, comprising:
   (a) a first bracket having sidewalls and a central, planar portion movable with respect to the sidewalls, the first bracket being rigidly affixed to the accessory at the sides of the accessory to embrace the accessory along three sides, the first bracket and the accessory being transportable as a unit;
   (b) a second, box-like bracket rigidly affixed to the support member, the second bracket having sidewalls, the sidewalls adapted to be adjustable relative to each other and engage and slidably receive the sidewalls of the first bracket;
   (c) adjustable mounting means for attaching the second bracket to the support member, the mounting means being disposed within the confines of the second bracket;
   (d) a tab extending outwardly of the first bracket to serve as a finger grip;
   (e) a plurality of stops affixed to the first bracket and adapted to engage the second bracket to limit relative movement of the first and second brackets;
   (f) a locking device carried by one of the brackets and disposed substantially within the confines of the second bracket when the first and second brackets are engaged; and
   (g) a plug-in electrical connector interconnecting the accessory and the vehicle and disposed substantially within the confines of the second bracket when the first and second brackets are engaged.

2. The apparatus of claim 1, wherein the plug-in electrical connector comprises:
   (a) a first portion having ramp-like electrical contacting surfaces and being carried by the first bracket; and
   (b) a second portion having ramp-like electrical contacting surfaces and being carried by the second bracket, the first and second portions being mated upon engagement of the first and second brackets.

3. The apparatus of claim 1, wherein the locking device comprises:
   (a) a tumbler portion carried by the second bracket and disposed within the confines of the second bracket; and
   (b) a key slot affixed to the tumbler portion and facing outwardly of the second bracket.

4. The apparatus of claim 1, wherein the sidewalls of the first and second brackets are flexed upon engagement to provide a tight, shock absorber-type carriage.

5. The apparatus of claim 4, wherein the sidewalls are rounded at their extremities to provide a smooth bearing surface.

6. A locking mount for attaching an accessory to a support member, comprising:
   (a) a first bracket rigidly affixed to the accessory, the first bracket comprised of elements slidable relative to each other to permit the first bracket to tightly embrace the accessory along three sides of the accessory, the first bracket and the accessory being transportable as a unit; and
   (b) a second bracket rigidly affixed to the support member, the second bracket receiving the first bracket within the confines of the second bracket so that the attachment between the accessory and the first bracket is covered by the second bracket and therefore is inaccessible when the first and second brackets are engaged, the first and second brackets being engageable and slidable relative to each other from a mounting position where the accessory is attached to the support member to a disengaged position where the accessory is free for transport.

7. The apparatus of claim 6, further comprising a locking device included as part of one of the brackets, the locking device adapted to engage a portion of the other bracket when the brackets are in the mounting position to prevent relative movement between the brackets.

8. The apparatus of claim 7, wherein the locking device substantially is covered by the first and second brackets and therefore is inaccessible when the first and second brackets are engaged.

9. The apparatus of claim 6, wherein:
   (a) a first portion of a plug-in electrical connector is disposed within the confines of the second bracket; and
   (b) a second portion of the plug-in electrical connector is carried by the first bracket and engages the first portion of the plug-in electrical connector when the first and second brackets are engaged.

10. A locking mount for attaching an accessory to a support member, comprising:
    (a) a first bracket rigidly affixed to the accessory, the first bracket embracing the accessory along three sides of the accessory, the first bracket and the accessory being transportable as a unit; and
    (b) a second bracket rigidly affixed to the support member, the second bracket comprised of elements slidable relative to each other to permit the first bracket to be tightly received within the confines of the second bracket so that the attachment between the accessory and the first bracket is covered by the second bracket and therefore is inaccessible when the first and second brackets are engaged, the first and second brackets being engageable and slidable relative to each other from a mounting position where the accessory is attached to the support member to a disengaged position where the accessory is free for transport.

11. The apparatus of claim 10, wherein the second bracket includes adjustable mounting means for attaching the second bracket to differently shaped support members, the mounting means being disposed within the confines of the second bracket and therefore inaccessible when the first and second brackets are engaged.

12. The apparatus of claim 10, further comprising a locking device included as part of one of the brackets, the locking device adapted to engage a portion of the other bracket when the brackets are in the mounting position to prevent relative movement between the brackets.

13. The apparatus of claim 12, wherein the locking device substantially is covered by the first and second brackets and therefore is inaccessible when the first and second brackets are engaged.

* * * * *